Dec. 14, 1937.   A. NAGEL   2,102,376
SHUTTER TRIGGER LATCH
Filed Oct. 2, 1936
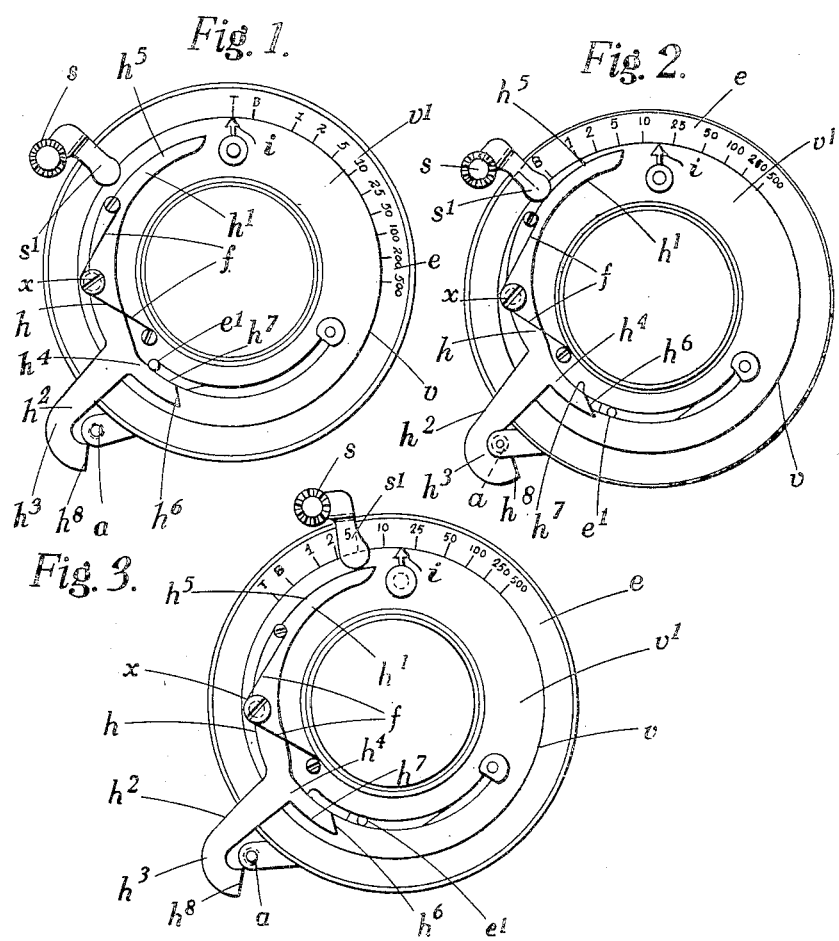
INVENTOR
August Nagel,
BY
ATTORNEYS Patented Dec. 14, 1937

2,102,376

UNITED STATES PATENT OFFICE 2,102,376

SHUTTER TRIGGER LATCH

August Nagel, Stuttgart, Germany, assignor to Eastman Kodak Company, Rochester, N. Y., a corporation of New Jersey Application October 2, 1936, Serial No. 103,702
In Germany October 4, 1935

7 Claims. (Cl. 95—62)

This invention relates to photographic shutters of the type in which variable exposures may be made by depressing a trigger to release the shutter mechanism.

One object of my invention is to provide a shutter latch so arranged that when the shutter is set for certain types of exposures the trigger may be latched, and so that when the shutter is set for other types of exposures the shutter trigger will be released. Such structures are particularly useful in cameras in which the shutter release may be arranged to function only when a shutter setting member has been actuated to first tension the shutter spring, such shutters being well known in the art.

One object of my invention is to provide a latch mechanism adapted to engage and prevent the operation of a shutter trigger unless the shutter has been first properly adjusted to make an exposure.

Another object of my invention is to provide a spring latch which not only holds the trigger in a latched position, but is released by movement of the setting lever of the shutter.

Other objects will appear from the following specification, the novel features being particularly pointed out in the claims thereof.

In the accompanying drawing, in which like reference characters denote like parts throughout, Fig. 1 illustrates a typical setting shutter in elevation, a portion of the cover-plate being removed to show the latch mechanism, which is in an inoperative position with the locking lever out of operative engagement with the trigger for time and bulb exposures.

Fig. 2 is a view similar to Fig. 1, but showing the locking lever preventing the operation of the trigger before the shutter setting lever has been placed under tension.

Fig. 3 is a view similar to the preceding figures, but showing the latching lever rendered inoperative by tensioning the shutter for an exposure by means of the setting lever.

In the embodiment of my invention shown in the drawing I have illustrated a well-known type of shutter, which includes a trigger $a$ by which the shutter mechanism is released for making an exposure and which includes a shutter setting lever $s$ by which the master member of the shutter is tensioned for making an exposure. There are a large number of such shutters on the market, and since the shutter mechanism itself forms no part of my invention, it is unnecessary to illustrate and describe the mechanism per se.

A typical shutter of this type may be the "Compur" shown in U. S. Patent 1,687,123, granted October 9, 1928.

On the front wall of the shutter casing $v$ a lever $h$ is pivoted at $x$. This lever may oscillate about its pivot, and has three arms, $h1$, $h2$ and $h6$. As shown in Fig. 1 the speed setting ring $e$ is adjusted to the index $i$ for setting the shutter for the required exposure. When the shutter is adjusted for a time exposure as shown in Fig. 1 the pin $e'$, which is carried by and moves with the ring $e$, is in engagement with the arm $h6$ so that the hook $h3$ of arm $h2$ is rocked upon its pivot $x$ out of engagement with the trigger member $a$.

In shutters of the type described it is only necessary to set the shutter spring when an instantaneous or delayed time exposure is to be made. Such exposures on the shutter illustrated may be from 1 sec. to 1/500 sec. However, when time or bulb exposures are to be made, since the spring need not be tensioned, an exposure can be made by depressing the trigger $a$ either once or twice to open and close the shutter blades for time or bulb exposures.

The same action takes place for both time and bulb exposures as is indicated in Fig. 1, since the surface of $h7$ of the arm $h4$ is only released from the pin $e1$ for instantaneous exposures or automatically delayed exposures as indicated in Figs. 2 and 3.

As shown in Fig. 2 the lever $h$ is rocked by a spring $f$ about the pivot $x$ until the hook $h3$ of arm $h2$ has engaged and locked the shutter trigger $a$. The arm $h1$ is thus moved until its edge $h5$ comes within the path of part $s1$ of the shutter setting lever $s$.

If, now, the tensioning lever $s$ is moved, $s'$ presses against the surface $h5$, thereby rocking lever $h$ about its pivot $x$ so that the trigger $a$ will be released as is illustrated in Fig. 3. When, however, an exposure is made and the lever $s$ returns to a normal position in which the shutter spring is not under tension, the spring $f$ will cause the hook $h3$ to again engage the trigger $a$ so that the trigger may not be actuated until the setting lever $s$ again places the spring of the shutter under tension.

It will thus be seen that I have prevented films being wasted from the fact that an operator may press the trigger without having first set the shutter spring. He may accordingly think that an exposure has been made, and wind a fresh area of film into place. With my improved shutter however, since it is impossible to actuate the trigger unless the shutter spring has just been tensioned, this difficulty has been overcome. Moreover, in shutters of the type described, where it is not necessary to set a shutter spring manually before making either time or bulb exposures, it is still possible to provide a latch which will automatically release the trigger when the shutter is set for such exposures.

Having thus described my invention, I claim:—

1. A locking mechanism for photographic shutters comprising, in combination, a trigger, a shutter tensioning member, a shutter setting member movable to different positions for determining the type of exposure, including instantaneous, time and bulb, an armed lever pivotally mounted on the shutter, a trigger latch carried by an arm of the lever, and means carried by the shutter setting mechanism adapted to engage and move said lever to release the trigger latch when said shutter setting member is moved to time or bulb position.

2. A locking mechanism in accordance with claim 1 in which the shutter setting member carries a projection adapted to move the pivotally mounted armed lever to release the trigger latch when said shutter setting member is moved into position for time or bulb exposure positions.

3. A locking mechanism in accordance with claim 1 in which the pivoted lever also includes an arm adapted to be engaged by moving the shutter tensioning member to a shutter tensioning position, whereby the shutter trigger latch may also be moved to release said trigger latch.

4. A locking mechanism in accordance with claim 1 in which the pivoted armed lever has three arms, two arms including cam surfaces adapted to be engaged by the shutter tensioning member and the shutter setting member respectively, and the third arm carrying the said trigger latch, whereby movement of the pivoted lever by either the shutter setting member or the shutter tensioning member engaging a cam on the arms of the lever may rock the lever and release the shutter trigger latch.

5. A locking mechanism for photographic shutters comprising, in combination, a trigger, a shutter tensioning member, a shutter setting member movable to different positions for determining the type of exposure, a lever pivotally mounted on the shutter and having two arms, one carrying a cam adjacent the shutter tensioning member and the other carrying a latch adjacent the trigger, the relative proportions of the arms being such that the trigger latch may restrain the trigger from movement except at such times as the shutter tensioning lever is moved to tensioning position at which time said cam on the arm adjacent the shutter tensioning member may be engaged and moved to release said trigger latch.

6. A locking mechanism for photographic shutters comprising, in combination, a trigger, a shutter tensioning member, a shutter setting member movable to different positions for determining the type of exposure, a lever pivotally mounted on the shutter and having two arms, one carrying a cam adjacent the shutter tensioning member and the other carrying a latch adjacent the trigger, the relative proportions of the arms being such that the trigger latch may restrain the trigger movement except at such times as the shutter tensioning lever is moved to tensioning position at which time said cam on the arm adjacent the shutter tensioning member may be engaged and moved to release said trigger latch, and a spring normally urging said pivoted lever into a trigger engaging position whereby the trigger may be automatically engaged after the trigger has been operated to actuate the shutter.

7. A locking mechanism for photographic shutters comprising, in combination, a trigger, a shutter tensioning member, a shutter setting member movable to different positions for determining the type of exposure, a lever pivotally attached to the shutter, three arms carried by the lever, each of two of said arms carrying cams adjacent respectively to the shutter tensioning member and the shutter setting member, either of which members may be moved to engage and move said lever, the third lever arm carrying a trigger latch adjacent the trigger, and a spring tending to move the lever to latch the trigger and at the same time tending to move the cam surfaces toward the shutter tensioning and setting members whereby movement of either member to engage a cam on the pivoted lever may release the trigger latch for operating the shutter.

AUGUST NAGEL.